United States Patent
McCaffrey et al.

(10) Patent No.: US 7,201,639 B2
(45) Date of Patent: Apr. 10, 2007

(54) POWDER FOR DISKS

(75) Inventors: Patrick Michael McCaffrey, Rochester, MN (US); Douglas Howard Piltingsrud, Eyota, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 886 days.

(21) Appl. No.: 09/840,077

(22) Filed: Apr. 24, 2001

(65) Prior Publication Data

US 2003/0092362 A1    May 15, 2003

(51) Int. Cl.
  *B24B 1/00* (2006.01)
  *B05D 1/02* (2006.01)
  *B65B 33/00* (2006.01)

(52) U.S. Cl. .............. 451/41; 451/44; 428/43; 428/167; 29/424

(58) Field of Classification Search .......... 451/41, 451/44, 285–290; 428/43, 167; 29/424
See application file for complete search history.

(56) References Cited

U.S. PATENT DOCUMENTS

| | | | | |
|---|---|---|---|---|
| 2,315,924 A | * | 4/1943 | Hendrik | 523/218 |
| 3,723,312 A | * | 3/1973 | Hay, Jr. | 508/506 |
| 3,797,394 A | * | 3/1974 | Rizzo | 118/69 |
| 3,856,472 A | * | 12/1974 | Schweitzer et al. | 417/48 |
| 5,073,181 A | * | 12/1991 | Foster et al. | 65/24 |
| 5,679,059 A | * | 10/1997 | Nishi et al. | 451/285 |
| 5,725,956 A | * | 3/1998 | McCurdy et al. | 428/441 |
| 5,738,574 A | * | 4/1998 | Tolles et al. | 451/247 |
| 5,791,357 A | * | 8/1998 | Hasegawa | 134/137 |
| 6,363,599 B1 | * | 4/2002 | Bajorek | 29/424 |
| 6,374,640 B1 | * | 4/2002 | Fotheringham et al. | 65/111 |
| 6,393,805 B2 | * | 5/2002 | Bates et al. | 53/447 |
| 6,491,972 B1 | * | 12/2002 | Weber et al. | 427/154 |
| 6,601,289 B1 | * | 8/2003 | Kobayashi | 29/599 |

FOREIGN PATENT DOCUMENTS

| | | | | |
|---|---|---|---|---|
| GB | 1134069 | * | 11/1968 | 260/746 |
| JP | 410208301 | * | 8/1998 | |

* cited by examiner

*Primary Examiner*—Lee D. Wilson
*Assistant Examiner*—Anthony Ojini
(74) *Attorney, Agent, or Firm*—Rabin & Berdo, PC

(57) ABSTRACT

A plurality of disks include a first disk and a second disk stacked upon the first disk. The first disk and the second disk are each formed from glass or glass-ceramic. A powder is disposed between the first disk and the second disk. The powder is selected from the group including calcium carbonate, calcium magnesium carbonate, calcium phosphate, magnesium carbonate, magnesium borate, magnesium oxide, magnesium phosphate, and clay.

6 Claims, 1 Drawing Sheet

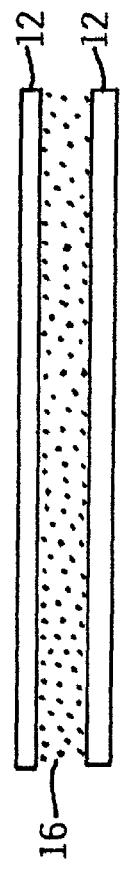
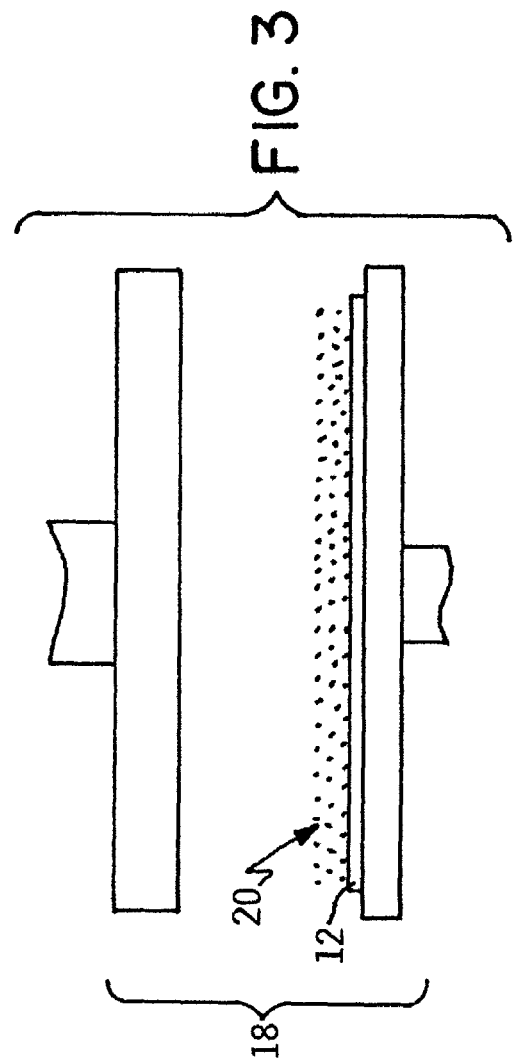
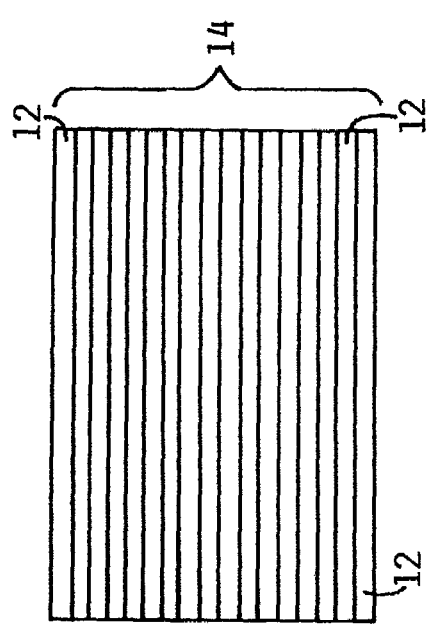

POWDER FOR DISKS

BACKGROUND OF THE INVENTION

1. Field of the Invention

The invention relates to a powder for disks, such as glass disks used in storage devices, and in particular to a powder for separating and cushioning stacked glass disks.

2. Background Information

Circular-shaped magnetic disks are typically used in hard disk drives of computers, for example, for use in data storage applications. Such magnetic disks may be formed from aluminum or from glass, for example, and will typically have a magnetic surface coating located thereon. A head of the disk drive interacts with the magnetic surface coating to read and write information to the disk. Such magnetic disks have achieved storage capacities of several gigabytes or more, using current technology.

Typically, the head of the disk drive that reads and writes information to the disk is arranged to fly a small distance above a surface of the disk. By bringing the head closer to the surface of the disk, higher density recording becomes possible.

As mentioned, often the magnetic disks are formed from aluminum. However, aluminum is relatively soft, so when it is handled, it is possible to ding the disk and form an area where data can not be retrieved from.

Further, the aluminum is typically coated with nickel plating to give the disk a harder and more defect free surface. However, the nickel plating has a low limit in hardness and has a tendency to become magnetic from composition or heating in sputter at temperatures greater than 300° C., causing errors in reading and writing to the disk.

Additionally, while aluminum disks can be made smooth, their surfaces are very easily damaged during disk manufacturing or file build causing asperities and glide failures. The smoother a magnetic disk can be made and kept, the closer the head can be brought to the surface of the disk during the read/write operations.

To overcome the problems associated with aluminum disks, attention has been directed to the utilization of glass disks, formed from alumina-silicate glass, for example. Typically, computer manufacturers purchase blank glass disks, for example from a glass manufacturer. Once received, the computer manufacturer subjects the blank glass disks to various processes that prepare the glass disks for use as a data storage device. For example, the blank glass disks may be polished by the computer manufacturer to remove surface scratches from the disks, and to planarize the surface of the disks to remove any waviness.

Conventionally, the glass manufacturer stacks the glass disks on top of one another to facilitate the transportation of the disks to the end user (i.e., the computer manufacturer, for instance). For example, the glass disks may be shipped in 50 disk stacks (i.e., 50 disks to a stack). To prevent the surface of one disk from scratching the surface of an adjacent disk, and to facilitate separation of the disks from the stack, it is further conventional to place a piece of paper between adjacent disks.

However, the use of such paper is problematic to the end user. For example, prior to any subsequent processing, the paper must be removed from between the glass disks and disposed of. Nevertheless, it is relatively common for some of the paper to end up in undesired locations, such as caught in the workings of an expensive piece of manufacturing equipment causing possible equipment damage and loss of thru-put, or as debris on the floor.

Moreover, in an attempt to automate the processing of the glass disks, it is also conventional to utilize specially tailored machines that are used to automatically remove the paper from the glass disks. For example, one such machine utilizes a needle to poke a hole in the paper and separate the paper from the associated disk. However, the paper will often fall off the disk at a non-desired location, such as in the final process cassette, causing manufacturing problems discussed above.

Moreover, occasionally more than one piece of paper will be erroneously placed between two adjacent stacked disks. Thus, even if the normal paper-removing process is successful in removing one of the pieces of paper, the other piece of paper may remain on the surface of the respective disk. This could cause the remaining paper to be moved into subsequent processing areas together with the disk, or the paper could be misidentified as the next disk, resulting in machine malfunctions. The paper could also be in a position to contaminate processing equipment.

Further, after the removal of the paper, the disks may be automatically moved using a disk-moving mechanism. However, if any paper remains on the surface of the disk, the disk-moving mechanism may erroneously identify the paper as being a disk, and attempt to move the paper, rather than the disk, to further processing stations. As will be appreciated, the presence of undesired paper can thus cause subsequent problems, including down time of the disk preparation processes, reduced productivity, and unnecessary expenses.

Thus, there is a need for a way to transport stacked glass disks that will protect the glass disks from damage, is compatible with subsequent processes to the glass disks, and will allow easy separation of the stacked glass disks, without the use of paper disposed between adjacent ones of the glass disks.

SUMMARY OF THE INVENTION

It is, therefore, a principle object of this invention to provide a powder for disks.

It is another object of the invention to provide a powder for disks that solves the above mentioned problems.

These and other objects of the present invention are accomplished by the powder for disks disclosed herein.

In an exemplary aspect of the invention, glass disks are transported, for example from the glass manufacturer to the end user, in a stack. The stack provides for a compact shipping arrangement, and helps to protect the disks from breakage during transport.

To prevent a disk from being damaged, for example by scratching an adjacent disk of the stack, and to facilitate the separation of the disks from each other, a powder is disposed between the adjacent disks. The powder coats a surface of the respective disks, so that the surface of one disk is spaced apart from the surface of an adjacent (superposed) disk using only the powder. The powder serves as a cushion between the disks, so that the disks will not damage one another. Moreover, the powder may absorb impacts to the stack caused by improper handling, thus protecting the disks from breakage. Further, the use of the powder will allow some spacing between the adjacent disks, preventing close forces of attraction as polarization and coulombic forces, from holding the disks together, thus facilitating the separation of the disks from the stack of disks.

In an exemplary aspect of the invention, the powder may be removed from the glass disks during a polishing operation. That is, after the disks are removed from the stack, they may be immediately moved to a polishing station for polishing of their respective surfaces. The subsequent polishing procedure is used to simultaneously polish the disk and remove the powder from the disks, dispersing the powder in the slurry, thus eliminating a separate cleaning procedure. An alternate method of removal would be the use of an air or water jet prior to the polish operation.

In an exemplary aspect of the invention, the powder is an inorganic material, such as an inorganic mineral. Inorganic powders have several advantageous characteristics as compared to organic powders. For example, organic powders cause reduced polish rates by acting as a lubricant between the pad/slurry and the glass which decreases planarization and increases polish time/costs. Moreover, since the polishing slurry is typically recirculated and reused, the concentration of the organic powder will increase within the slurry over time, shortening slurry life. Thus, the use of an inorganic powder will reduce any cumulative adverse effects, allowing the slurry to be used for as long a period of time as is standard practice with current manufacturing.

Inorganic powders can be chosen that are soft enough not to scratch the glass and stable enough that the slurry pH stays in its normal range of 7–12 over its lifetime.

In a further aspect of the invention, the powder is calcium carbonate. Alternatively, other powders that exhibit similar suitable properties may be used. For example, the powder could be selected from the group including calcium carbonate, calcium magnesium carbonate, calcium phosphate, magnesium carbonate, magnesium borate, magnesium oxide, magnesium phosphate, and clay. These materials are relatively inert, have a pH of 7–12, and are safe to use. Moreover, the presence of a powder composed of these materials on a disk will not adversely affect the subsequent polishing process by such things as scratching or lubricating. Additionally, these powders are readily available, and can be purchased from a variety of sources.

In a further exemplary aspect of the invention, the powder has a grain size of about a 200 mesh. Such a size powder can be easily dispersed in the slurry, and will be large enough to serve as a spacer and cushion to the disks.

BRIEF DESCRIPTION OF THE DRAWINGS

FIG. 1 is an elevational view of a stack of glass disks.

FIG. 2 is an enlarged, exaggerated view of two adjacent ones of the glass disks shown in FIG. 1, spaced apart using a powder in accordance with an exemplary aspect of the present invention.

FIG. 3 is an elevational view of one of the glass disks shown in FIG. 2, during a polishing operation.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper", "lower", "front", "back", "over", "under", and similar such terms are not to be construed as limiting the invention to a particular orientation. Instead, these terms are used only on a relative basis.

The present invention is directed toward disks, such as glass or glass-ceramic disks used as data storage devices in disk drives. By way of example, the glass disks are formed from alumino-silicate glass. Further, the disks typically are standardized in diameter. For example, the current conventional disks have one of a diameter of 65, 70, 84, or 95 millimeters, for example. Further, the disks typically have a concentric hole having a diameter, for example, of about 25 millimeters, which receives a rotatable shaft of a disk drive (not shown), for rotating the disk. Of course, the invention is not limited to disks of these particular sizes or configurations. To the contrary, the disks may have other sizes or shapes within the spirit of the invention.

Often, the glass disks are purchased as blanks by an end user, such as a computer manufacturer, from a glass manufacturer. After receipt, the computer manufacturer may subject the glass disks to various treatments, in order to provide disks that are better suited for use in data storage applications. For example, it may be desired that the final product have a smoother surface finish, so that a head of an associated disk drive can be brought closer to the surface of the disk. By bringing the head closer to the surface of the disk, higher density recording becomes possible.

Thus, in order to prepare the glass disks for use as data storage devices, the computer manufacturer may subject the glass disks to one or more polish steps. This may be followed by an ultrasonic cleaning, then a second step cleaning. Thereafter, the glass disks may be placed in a cleaner, which may include a series of chemical and scrub tanks to clean off any remaining slurry used in the polishing process from the disks. Next, the disks may be subjected to a chemical strengthening process. Thereafter, the glass disks may be placed into a wet tank where the disks can be kept wet until being fed into another cleaner. Of course, the various procedures and treatments to the glass disks may be modified, added to, or eliminated in any manner without departing from the scope of the invention.

The glass disks may be transported in the aforementioned processes using process cassettes (not shown), each of which holds 25 glass disks, for example. The process cassettes have the disks arranged therein at a predetermined spacing, for example, a quarter inch spacing.

Referring to FIG. 1, glass disks 12 are transported, for example from the glass manufacturer to the end user, in a stack 14. The stack 14 provides for a compact shipping arrangement, and helps to protect the disks 12 from breakage during transport. Such stack may include 50 disks (although fewer are shown for purpose of clarity), and have a shrink-wrap covering (not shown) to hold the disks together. Of course, the stack may have a different number of disks, or be held together in a different manner, without departing from the spirit and scope of the invention.

Referring also to FIG. 2, to prevent a disk 12 from being damaged, for example by scratching an adjacent disk of the stack, and to facilitate the separation of the disks from each other, a powder 16 is disposed between the adjacent disks. As is inherent with all powders, the powder 16 is constituted by a plurality of fine, loose particles. The powder 16 coats essentially an entire surface of the respective disks 12, so that the surface of one disk is spaced apart from the surface of an adjacent (superposed) disk using only the powder (i.e., no paper is used). The powder 16 serves as a cushion between the disks 12, so that the disks will not damage one another. Moreover, the powder 16 may absorb impacts to the stack 14 caused by improper handling, thus protecting the disks 12 from breakage. Further, the use of the powder 16 will prevent close forces of attraction as polarization and coulombic forces from holding the disks together, thus facilitating the separation of the disks from the stack of disks.

In an exemplary aspect of the invention, the powder 16 is placed between adjacent ones of the disks 12 by the glass manufacturer. The powder 16 can be placed between the disks 12 during the stacking of the disks or prior to stacking the disks, depending on the desires of the glass manufacturer.

Moreover, and referring to FIG. 3, the powder 16 may be at least partially removed from the glass disks 12 during a polishing operation, for example. That is, after the disks 12 are removed from the stack 14, they can be immediately moved to a polishing station 18 for polishing of their respective surfaces. The polishing station 18 uses a slurry 20 to polish the surfaces. The slurry 20 can be used to disperse the powder 12, so that any slurry/powder mixture remaining on the disks can be removed in subsequent cleaning processes. The polishing procedure can thus be used to remove the powder from the disks, thus eliminating a separate cleaning procedure.

In an exemplary aspect of the invention, the powder 16 is an inorganic material, such as an inorganic mineral. Inorganic powders have several advantageous characteristics as compared to organic powders. For example, organic powders lubricate the polish interfaces reducing planarization and increasing polish time. Adding polish time raises costs. Inorganic powders can be chosen that do not cause polish problems. For instance, the slurry has a relatively high pH, for example about 9 or higher. Similarly, the powder 16 has a relatively high pH. For example, an exemplary aspect of the invention utilizes a powder having a pH of about 9.0–9.5. Thus, the powder will not change the pH of the slurry to outside its normal 7–12 range. Moreover, even though the polishing slurry 20 is typically recirculated and reused by the polishing station 18, the increasing concentration of the inorganic powder will not induce the cumulative adverse effects an organic powder would have, thus allowing the slurry to be used for as long a period of time as is standard practice with current manufacturing processes. Inorganic powders eliminate such problems.

In a further aspect of the invention, the powder is calcium carbonate. Alternatively, other powders that exhibit similar suitable properties may be used. For example, the powder could be selected from the group including calcium carbonate, calcium magnesium carbonate, calcium phosphate, magnesium carbonate, magnesium borate, magnesium oxide, magnesium phosphate, and clay. These materials are relatively inert and safe to use. Moreover, the presence of a powder composed of these materials on a disk will not adversely affect the subsequent polishing procedure. Additionally, these powders are readily available, and can be purchased from a variety of sources.

In a further exemplary aspect of the invention, the powder has a size between about 150 and 300 mesh. In an exemplary aspect of the invention, the powder has a mesh size of about 200 (i.e., about 75 micrometers or about 3 thousandths of an inch). Such a size will allow the powder to be easily dispersed in the slurry, and will be large enough to serve as a cushion to the disks.

It should be understood, however, that the invention is not necessarily limited to the specific process, arrangement, materials and components shown and described above, but may be susceptible to numerous variations within the scope of the invention. For example, although the above-described exemplary aspects of the invention are believed to be particularly well suited for transporting glass disks, it is contemplated that the concepts of the present invention can be applied in other applications. For example, the concepts of the present application can be utilized whenever it is desired to store or transport various work pieces, whatever they may be. Moreover, it is also contemplated that the present invention may be utilized to transport or store glass disks at other stages of the preparation of the disks.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. In combination, a plurality of disks including a first disk and a second disk stacked upon said first disk, and a powder disposed between said first disk and said second disk, said powder facilitating removal of said first disk from said second disk, and protecting said first disk and said second disk from scratches, and serving to cushion said first disk and said second disk to protect said disks from impact damage, when said second disk is stacked upon said first disk, wherein said first disk and said second disk are each comprised of one of a glass and glass ceramic;

wherein only said powder spaces said first disk from said second disk; and wherein said powder has a grain size larger than a micron in size and is comprised of an inorganic material.

2. The combination recited in claim 1, wherein said inorganic material is calcium carbonate.

3. The combination recited in claim 1, wherein said inorganic material is selected from the group consisting of calcium carbonate, calcium magnesium carbonate, calcium phosphate, magnesium carbonate, magnesium borate, magnesium oxide, magnesium phosphate, and clay.

4. In combination, a plurality of disks including a first disk and a second disk stacked upon said first disk, and a plurality of fine, loose particles constituting a powder disposed between said first disk and said second disk, said plurality of fine, loose particles facilitating removal of said first disk from said second disk, and protecting said first disk and said second disk from scratches, and serving to cushion said first disk and said second disk to protect said disks from impact damage, when said second disk is stacked upon said first disk, wherein said first disk and said second disk are each comprised of one of a glass and glass ceramic; and wherein said first disk is spaced apart from said second disk by only said fine, loose particles; and wherein said fine, loose particles have a grain size larger than a micron and are comprised of an inorganic material.

5. The combination recited in claim 4, wherein said inorganic material is calcium carbonate.

6. The combination recited in claim 4, wherein said inorganic material is selected from the group consisting of calcium carbonate, calcium magnesium carbonate, calcium phosphate, magnesium carbonate, magnesium borate, magnesium oxide, magnesium phosphate, and clay.

* * * * *